A. W. JACKSON & H. J. BONHAM.
EXHAUSTING MACHINE.
APPLICATION FILED JULY 23, 1915.

1,184,530.

Patented May 23, 1916.
2 SHEETS—SHEET 1.

WITNESSES

INVENTORS
Augustus W. Jackson,
Harry J. Bonham,
BY
ATTORNEYS

A. W. JACKSON & H. J. BONHAM.
EXHAUSTING MACHINE.
APPLICATION FILED JULY 23, 1915.
1,184,530.
Patented May 23, 1916.
2 SHEETS—SHEET 2.
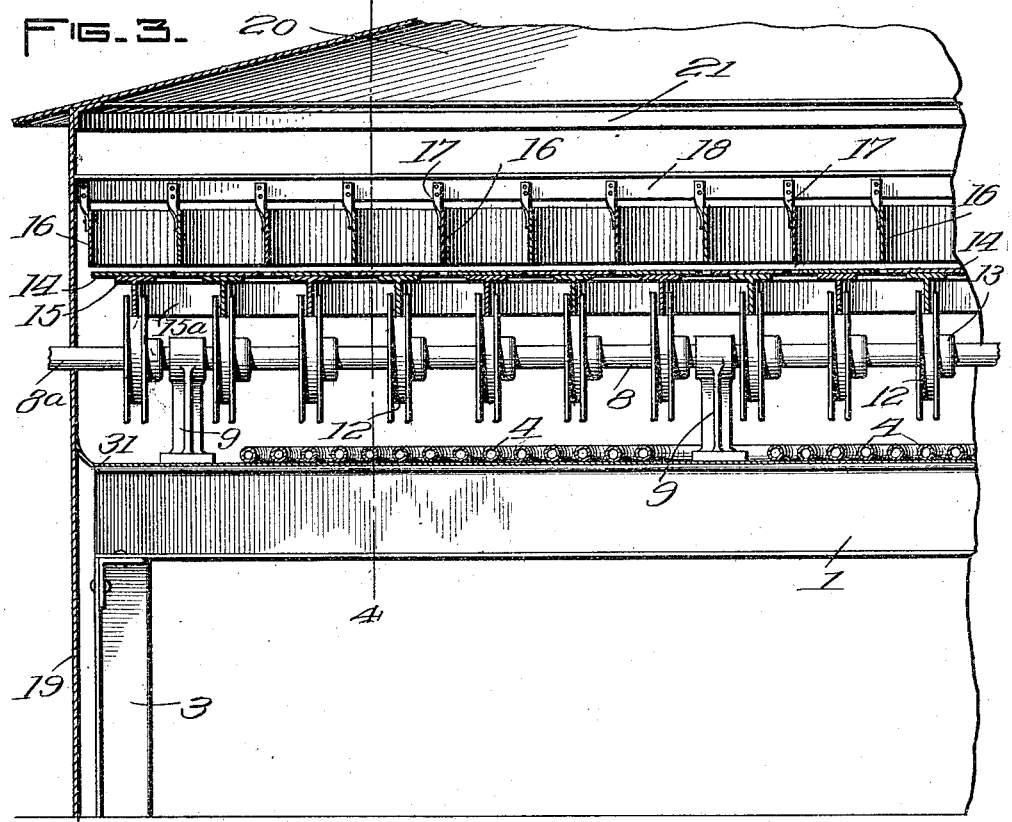
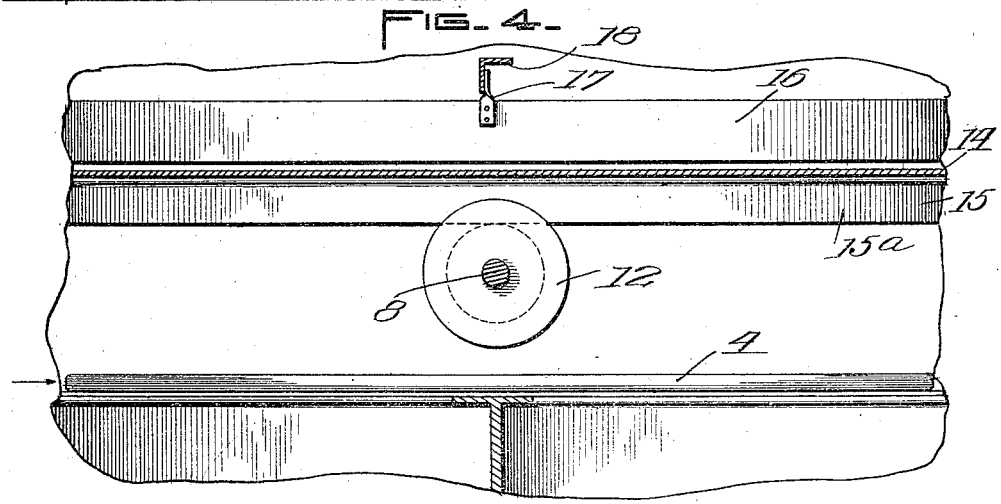
WITNESSES:
John Y. Phillips
C. E. Tranor
INVENTOR
AUGUSTUS W. JACKSON,
HARRY J. BONHAM,
BY
Munn & Co.
ATTORNEYS

UNITED STATES PATENT OFFICE.

AUGUSTUS W. JACKSON, OF HOLLYWOOD, AND HARRY J. BONHAM, OF LOS ANGELES, CALIFORNIA.

EXHAUSTING-MACHINE.

1,184,530.    Specification of Letters Patent.    Patented May 23, 1916.

Application filed July 23, 1915. Serial No. 41,490.

*To all whom it may concern:*

Be it known that we, AUGUSTUS W. JACKSON, of Hollywood, in the county of Los Angeles and State of California, and HARRY J. BONHAM, of Los Angeles, in the county of Los Angeles and State of California, citizens of the United States of America, have invented certain new and useful Improvements in Exhausting-Machines, of which the following is a specification.

Our invention is an improvement in exhausting machines, and the invention has for its object to provide mechanism of the character specified, for partially exhausting the air from cans for containing fruit and food products, after the cans have been filled, and before they are capped.

Figure 1:
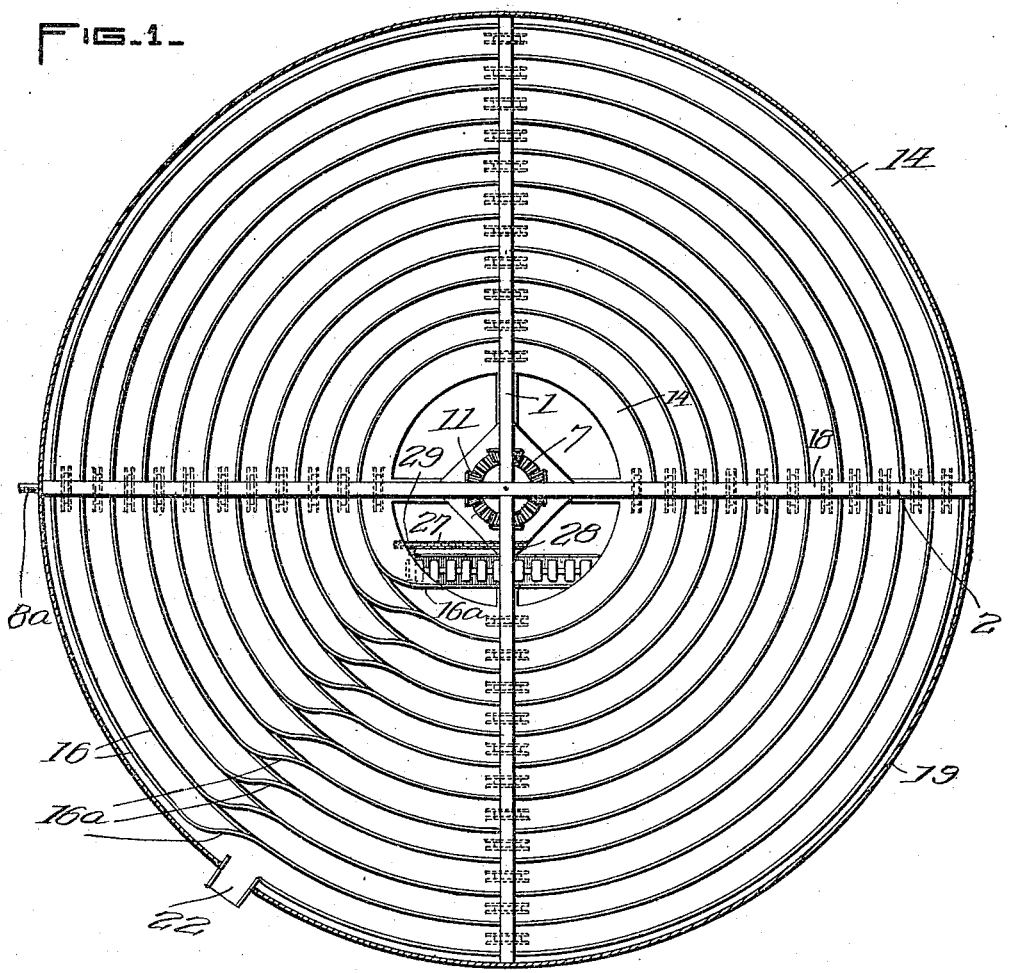
Figure 2:
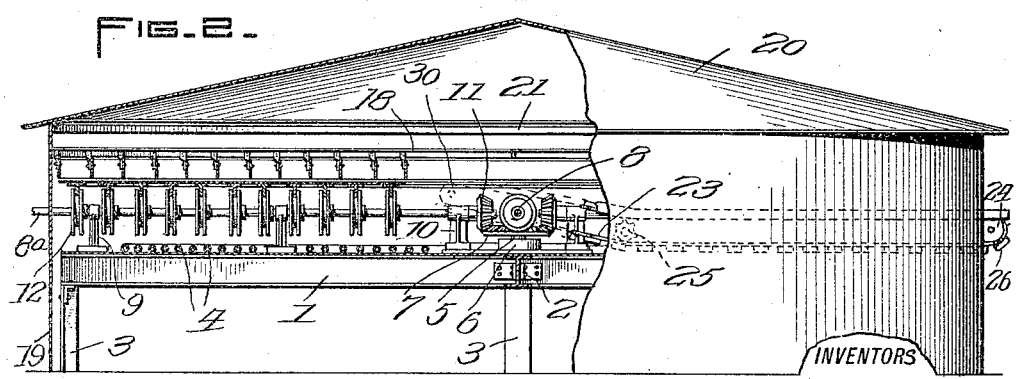

In the drawings, Figure 1 is a top plan view of the machine with the cover removed; Fig. 2 is a side view partly in section; Fig. 3 is an enlarged detail of a portion of Fig. 2; Fig. 4, is a section on the line 4—4 of Fig. 3.

In the present embodiment of the invention, a supporting frame is provided, consisting of two I beams 1 and 2, arranged in crossed relation, and supported by depending legs 3 of T material. Heating coils 4 are supported on the frame, the said coils being adapted to heat the cans.

A shaft 5 carrying a beveled master gear 7 is journaled in vertical position above the intersection of the beams. Other shafts 8 are journaled radially of the frame just above the I beams, and the said shafts are spaced apart at angular distances of ninety degrees. Each shaft is journaled in bearing brackets 9 and 10 secured to the I beams. The inner end of each shaft has fastened to it a bevel gear or pinion 11 engaging and meshing with the master gear 7.

A series of annular grooved wheels 12 is secured to each shaft, each wheel having a hub 13 arranged on the shaft, and secured thereto in any suitable manner. The wheels 12 are spaced apart from each other at regular distances on each shaft, and the wheels of all of the shafts are in register, that is, the corresponding wheels of the four shafts are spaced apart at equal radial distances on the shaft.

A series of rings 14 is arranged above the shafts, the rings being plane and in the same horizontal plane. A second ring is secured to the under side of each of the rings 14, each of the said second rings being of T-shape in cross section and consisting of a horizontal portion 15 secured to the under side of the adjacent ring 14 at the center thereof, and a vertical portion 15$^a$ extending downwardly from the center of the portion 15, and the portion 15$^a$ of each of the T-shaped rings engages the grooves on the four wheels of the shafts that register with the said rings.

The cams to be treated are arranged on the rings 14, and mechanism is provided for preventing displacement of the cans radially with respect to the rings. The said mechanism comprises a series of vertically arranged guide bands 16, the said bands being arranged at the space between adjacent rings 14, and at the periphery of the outermost ring of the series 14. The guide bands are supported by bracket lugs or straps 17, the said straps being secured at their upper ends to supporting bars 18 and at their lower ends to the bands 16.

The supporting bars 18 above the bands 16 are supported by a casing which incloses the mechanism just described, and the said bars are of angle material and arranged with their horizontal portions upward. The bars 18 are arranged parallel with the I beams 1 and 2, and the lower edges of the bands 16 are spaced apart above the upper surfaces of the rings 14. The inclosing casing comprises a cylindrical body 19 and a cover 20 of conical shape and of a size to extend beyond the body 19 at its outer edge. A ring 21 of angular material is secured to the surface of the cover near the periphery thereof, the said ring consisting of two portions extending at an obtuse angle with respect to each other. One of the portions is secured to the inner face of the cover, and the other depends vertically therefrom, fitting within the body at the top thereof.

The bands 16 provide a series of annular guideways between adjacent bands, and communicating passages are provided between adjacent guide ways. It will be noted that the body 19 of the inclosing casing is provided with an inlet opening 22, the said inlet giving access to the space between the outermost band and the next inner. Adjacent to this point communicating passages are provided leading from each guide way to the next inner, as shown more particularly in Fig. 1. These communicating or transferring passages are provided by bending a portion 16ª of each band inward into contact with the next innermost band, and the arrangement is such that as each can is moved around the annular passage between the adjacent bands, just as the can completes the circle it will meet one of the deflecting partitions 16ª and will be deflected through the adjacent guideway into the next inner passage.

At the innermost ring 14, the cans are guided from the machine by a conveyer consisting of an endless belt or chain 23, supported on pulleys or sprocket wheels 24 and 25, and slats 26 are secured to the belt transversely thereof for engaging the cans. The conveyer extends through an opening in the body of the inclosing casing, the sprocket wheel 24 being arranged outside of the body. The endless conveyer is driven by a sprocket chain 27, which connects a sprocket wheel 28 on one side of the shafts with a sprocket wheel 29 on a shaft 30 to which the innermost sprocket wheel 25 of the endless carrier is secured. This conveyer, as shown in Fig. 1, runs near one side of the innermost ring 14, and the deflecting partition 16ª of the innermost band 16 is arranged to deflect the cans from the innermost ring 14 onto the endless conveyer.

It will be seen from an inspection of Fig. 2, that the inner end of the conveyer inclines upwardly to receive the cans from the innermost ring 14. The inclosing casing, including the cover, is of steel, and a horizontal partition 31 is provided in the casing at the top of the I beams, the said partition dividing the casing into upper and lower compartments. The coils 4 rest upon the said partition.

In operation, the filled cans are fed through the inlet opening 22 in any suitable manner, onto the outermost ring 14. The temperature of the compartment above the partition 31 having been raised to the desired degree by the steam coils, the cans are fed in succession through the inlet opening 22. The shafts 8 are driven at the same speed, one of the shafts being extended outside of the casing, as indicated at 8ª, for connection with a suitable source of power (not shown). This shaft drives the vertical shaft 5 and its gear 7, which in turn drives the other bevel pinions 11 and their respective shafts 8, thus all shafts 8 have the same angular velocity. As the cans travel with the rings 14, they are passed around the inclosing casing on the outermost ring, until they reach the deflecting partition 16ª. As the cans reach this partition they will be moved inwardly toward the succeeding ring and they will travel in the same manner on the second ring until they have completed the circuit in the annular passage just above the ring. Each can will thus be carried by each ring entirely around the casing, encircling the central shaft as many times as there are rings 14. From the innermost ring 14 each can is eventually deflected onto the endless conveyer, and by the said conveyer the cans are removed from the machine. The angular velocity of each ring is somewhat less than that of the next inner ring, the outermost ring traveling at a considerably lower rotational speed than the innermost ring. Thus a uniform, linear surface speed will be maintained from the outermost to the innermost ring.

The grooved wheels 12 support the rings 14 and revolve the rings about the central shaft. The inclosing casing protects the contents of the open cans from contamination, and since there are no moving parts above the cans, there is no possibility of matter dropping into the cans, as for instance, from condensation, grease, dirt or the like. The pitch of the conical cover is sufficient to carry any condensation to the body of the casing.

Each ring moves at a slightly accelerated speed when compared to the next outer ring, thus maintaining the proper spacing of the cans. There is no danger of the cans falling, or fouling each other, because of the guide bands 16, and because of the fact that the cans move in the same direction at all times.

The improved machine may be made of any desired size, containing any suitable number of supporting rings. The top or cover is made removable, in order to permit access to the interior of the casing.

We claim:

1. A device of the character specified, comprising a supporting frame, an inclosing casing for the same, heating coils supported on the frame, a vertical shaft at the center of the frame, radial shafts journaled on the frame and having a driving connection at their inner ends with the vertical shaft, one of the radial shafts being extended beyond the casing for connection with a suitable source of power, a series of plane rings arranged in concentric relation above the shafts and in the same horizontal plane for supporting the cans to be treated, a T-shaped ring comprising a horizontal body and a vertical web at the center of the body secured to the under surface of the rings, grooved wheels secured to the radial shafts and engaging the depending webs of the adjacent rings, the spacing of the wheels on each shaft corresponding to the spacing of the wheels of the other shafts, guide bands above the rings in vertical position and in concentric relation for holding the cans on the horizontal rings, said bands being at opposite sides of the rings, said casing having an inlet for the cans and each guide band having a deflecting partition for guiding the cans from the ring at the inner side of said band to the next inner ring.

2. A device of the character specified, comprising a supporting frame, an inclosing casing for the same, heating coils supported on the frame, a vertical shaft at the center of the frame, radial shafts journaled on the frame and having a driving connection at their inner ends with the vertical shaft, one of the radial shafts being extended beyond the casing for connection with a suitable source of power, a series of plane rings arranged in concentric relation above the shafts and in the same horizontal plane for supporting the cans to be treated, each of the plane rings having a depending rib, grooved wheels secured to the radial shafts and engaging the ribs on the rings, guide bands above the rings for holding the cans on the rings, means in connection with each band for deflecting the cans therefrom onto the next inner band, and means at the center of the frame for receiving the cans from the inner band and removing them from the casing.

3. A device of the character specified, comprising a supporting frame, an inclosing casing for the same, means on the frame for heating the cans, a series of radial shafts journaled on the frame and having a driving connection at their inner ends, one of the shafts being extended beyond the casing for connection with a source of power, a series of concentric plane rings arranged in the same horizontal plane above the shafts, each ring having a depending web, grooved wheels on the shafts engaging the webs for revolving the rings when the shafts are rotated, means adjacent to the rings and above the same for guiding the cans and holding them on the rings as the rings revolve, said guiding and holding means being fixed and having means in connection therewith for deflecting the cans at the end of each complete revolving movement of the rings onto the next inner ring and means within the inner ring for receiving the cans therefrom and removing them from the casing.

4. In a device of the character specified, a series of plane rings for holding the cans to be treated, said rings being arranged coaxially and in the same horizontal plane, means for holding the cans on the respective rings and for deflecting the cans from each ring to the next inner ring when the cans thereon have made a complete revolution, a common driving means for all the rings, said means comprising radial shafts arranged beneath the rings, each shaft having a grooved wheel at each ring, and each ring having a depending continuous rib engaging the adjacent wheels of the shafts, and means for simultaneously rotating the shafts.

AUGUSTUS W. JACKSON.
HARRY J. BONHAM.

Copies of this patent may be obtained for five cents each, by addressing the "Commissioner of Patents, Washington, D. C."